L. D. BELL.
CLEVIS.
APPLICATION FILED APR. 11, 1911.
1,001,241.
Patented Aug. 22, 1911.
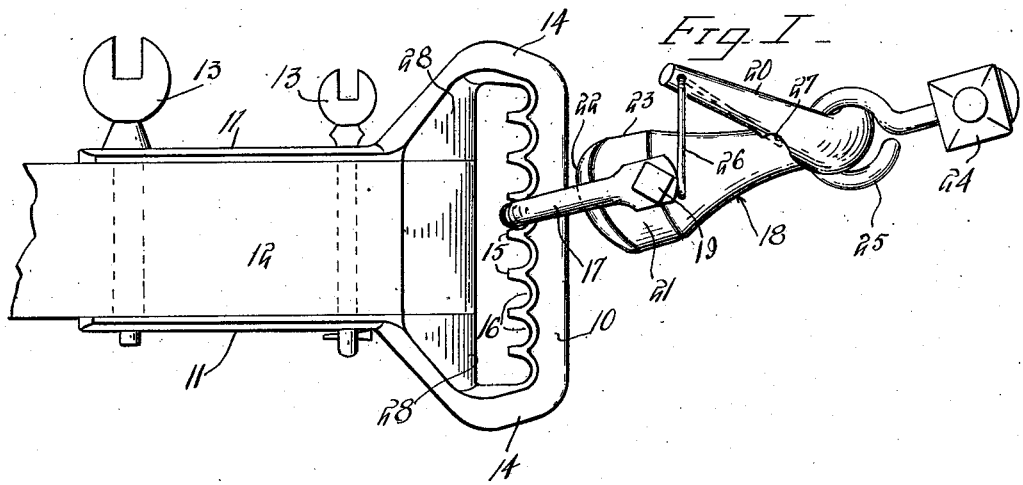
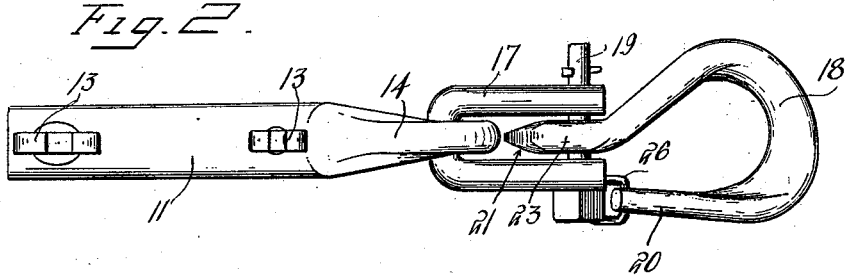
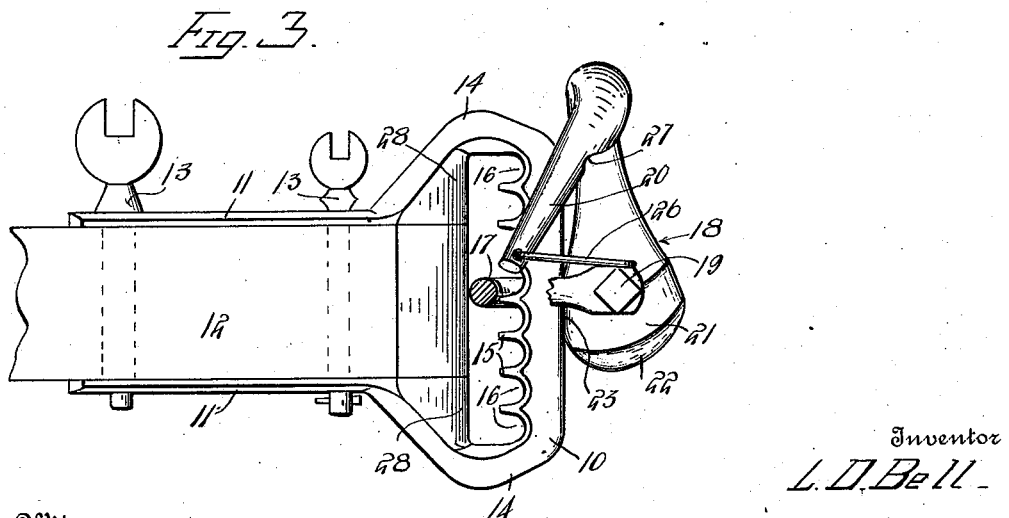
Inventor
L. D. Bell
Witnesses
By
Attorneys
COLUMBIA PLANOGRAPH CO., WASHINGTON, D. C.

UNITED STATES PATENT OFFICE.

LORENZO D. BELL, OF MOORMAN, KENTUCKY.

CLEVIS.

1,001,241.

Specification of Letters Patent. Patented Aug. 22, 1911.

Application filed April 11, 1911. Serial No. 620,293.

*To all whom it may concern:*

Be it known that I, LORENZO D. BELL, a citizen of the United States, residing at Moorman, in the county of Muhlenberg, State of Kentucky, have invented certain new and useful Improvements in Clevises; and I do hereby declare the following to be a full, clear, and exact description of the invention, such as will enable others skilled in the art to which it appertains to make and use the same.

This invention relates to new and useful improvements in clevises and the object of the invention is to provide a novel form of clevis in which the attaching hook may be adjusted in different vertical positions in a novel manner.

Another object of the invention is to provide a novel form of hook member and a link connected to the end of the hook and adapted to fall by gravity in contact with the head of the securing pin for the hook so as to prevent the accidental disengagement of the attaching link of the whiffletree.

The invention consists of certain other combinations and arrangements of parts as will be hereinafter more fully described and clearly specified in the appended claims.

In the drawings:—Figure 1 is a side elevation of my improved clevis attached to one end of a plow beam. Fig. 2 is a top plan view thereof. Fig. 3 is a similar view to Fig. 1 by showing the hook member disposed in a vertical position for adjustment of its attaching yoke upon the notches of the beam attaching member.

Referring to the drawings in detail, there is shown an attaching member or casting 10 which is provided with rearwardly extending spaced legs 11 adapted to receive the forward end of the plow beam 12 upon its upper and lower sides and be secured thereto by suitable bolts 13, preferably in the form of wrench-headed bolts or pins as shown. The head of the attaching member or casting 10 is disposed in a vertical position and projects at its upper and lower sides from the attaching legs 11 so as to form a vertical slot between the raised projecting portions 14, the forward end of the plow beam and the inner wall of the casting 10. This wall is provided with a series of rearwardly projecting teeth 15 forming intervening notches 16 adapted to receive the bight portion of a yoke 17.

The yoke 17 at its bight portion is properly formed to fit the recesses 16 and for adjustment within the slot for engagement with the several notches as desired and has its leg portions extending forwardly of the head of the attaching member for pivotally securing a hook 18 thereto through the medium of a headed bolt or pin 19, the head of the pin being disposed in a vertical line with the upwardly inclined or offset end portion 20 of the hook. The yoke 17 is disposed normally in an inclined position and as the bolt 19 extends through the ends of the leg members and the head portion 21 of the hook to form a cam surface 22 at the upper rear portion of the head, accidental disengagement of the bight portion of the yoke from the notches is prevented due to the contact of said cam surface 22 with the forward edge of the casting 10. The cam surface 22 is the point of greatest eccentricity of the head 21 and is tapered or rounded throughout the rear and underside of the head so that disengagement of the bight portion of the yoke from the notches is prevented should the hook member swing downwardly by gravity or otherwise.

In order to adjust the yoke within the notches of the casting 10, the hook is moved to a vertical position shown in Fig. 3 of the drawings whereupon its flattened upper portion 23 will be spaced from the forward edge of the casting a distance greater than the length of the teeth 15, thus permitting the yoke member to be moved inwardly and engaged with anyone of the notches. This is due to the fact that the flattened portion 23 is the point of smallest eccentricity of the head member from its pivot bolt 19 and by reason of the necessity of moving the hook to an upward position in order to accomplish such adjustment, ordinary movement of the whiffletree 24 and its attaching link 25 will not cause disengagement of the bight portion of the yoke from the notches as would be likely to occur if downward movement of the hook were necessary in order to accomplish such adjustment.

As before mentioned, the end 20 of the hook member is offset or inclined vertically and is disposed in a vertical line with the head of the attaching bolt 19 for the hook and in order to further prevent the disengagement of the link 25 from the hook, a gravital keeper or link 26 is pivotally attached to the end of the hook and in its normal position contacts with the head of the bolt 19 so that any attempt to remove the link 25 through the entrance opening between the ends of the hook and the bolt, will be prevented. In order that the said link 25 may be attached to the hook, the keeper link 26 is adapted to be moved upwardly in the position shown in dotted lines in Fig. 1 of the drawings with its free end disposed within a notch 27 in the underside of the hook and thus permitting the link 26 to enter the hook proper without destroying the keeper link or being encountered with any resistance in such attachment.

From the foregoing description it will be apparent that the parts may be constructed of material as will be found desirable and it is also preferred that the projecting portions 14 be beveled upon the sides as shown at 28 to correspond with the forward end of the plow beam and also permit the yoke 17 to be turned at a wider angle, thereby permitting the plow or implement to make shorter turns.

I claim:—

1. A clevis comprising the combination with an attaching member having a vertical slot, the forward wall of said slot having a series of notches therein; of a yoke member having its bight portion engaged in the notches and extended forwardly thereof, a hook positioned between the forward extended legs of the yoke, a bolt for retaining said yoke in position, and a keeper link pivotally secured to the vertically offset end of the hook and adapted to contact with the bolt in its normal position.

2. A clevis comprising an attaching member having a vertically extended head provided with a longitudinal slot, the forward wall of the slot having rearwardly extended teeth forming notches, a yoke having its bight portion in the slot and having forwardly extended legs at opposite sides of the head, said bight portion being adapted for interchangeable engagement with the notches, a hook member having a head portion provided with a camming surface, at its rear and bottom edges, a pin pivotally securing said head eccentrically to the ends of the yoke, said hook having its upper surface flattened to permit movement of the yoke inwardly to disengage its bight portion from the notches when the hook is swung to a vertical position and a gravital keeper pivotally secured to the end of the hook and adapted to normally contact with the head of the pin, said hook end being offset vertically in line with said head and having a recess to receive the free end of the keeper upon the entrance of a draft member.

3. A clevis comprising a head having rearwardly extending attaching legs and a vertical slot, the forward portion of the head being provided with upper and lower projections in which the ends of the slots terminate, notches formed in the front wall of the slot, the rear wall of the slot and forward portion of a plow beam attached between the legs having beveled side portions, a yoke interchangeably engaged in the notches, a hook having a cam head disposed between the extremities of the yoke, a pivot extending through the cam head of the yoke, said cam head being spaced from the forward edge of the head of the attaching member when moved to an upward position to permit inward movement of the yoke to disengage its bight portion from the notches.

In testimony whereof, I affix my signature, in presence of two witnesses.

LORENZO D. BELL.

Witnesses:
WALLIS WHITMER,
S. L. ROSS.

Copies of this patent may be obtained for five cents each, by addressing the "Commissioner of Patents, Washington, D. C."